United States Patent Office 3,090,808
Patented May 21, 1963

3,090,808
PRODUCTION OF HALO-SUBSTITUTED
CARBONYLIC COMPOUNDS
Morris S. Kharasch, Chicago, Ill., and Walter Nudenberg, Cedar Grove, N.J., assignors to Shell Oil Company, a corporation of Delaware
No Drawing. Filed Feb. 15, 1957, Ser. No. 640,309
6 Claims. (Cl. 260—539)

This invention relates to novel processes for the preparation of halogenated carboxylic acids having from 3 to 9 carbon atoms in a chain connecting the said halogen and the carboxy group.

The new processes of this invention give as their principal products compounds which may be represented by the general formula

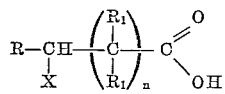

wherein X is a halogen atom selected from bromine and iodine, R is hydrogen or hydrocarbyl, each $R_1$ represents an atom of hydrogen or a halogen, a functional group such as an alkoxy, hydroxy, aryloxy, carbalkoxy, carbaryloxy or sulfone group, or the same or different hydrocarbon radicals, for instance, alkyl, cycloaliphatic and aromatic hydrocarbon radicals of 1 to 12 carbon atoms which can be substituted by the foregoing functional groups or by halogen atoms, and $n$ represents an integer of from 2 to 8, inclusive. The process provides for the manufacture of carboxylic acids having 3 to 9 carbon atoms in a chain joining the bromine or iodine with a terminal carboxyl group.

It has been discovered that the carboxylic acids defined as above can be produced by reacting, under redox conditions, a halogen-yielding compound which may be a salt of bromine and iodine or a geminate hydrocarbon polyhalide of which at least one of the geminate halogens is selected from bromine and iodine, with an "organic cyclic peroxide" which term is more fully defined hereinafter.

The essential feature of the "organic cyclic peroxide" is that it contains 4 to 10 carbon atoms in a primary ring having a hydroxyl or alkyl radical and a peroxy (—O—O—) or hydroperoxy (—O—OH) radical directly attached to the same cyclic carbon. These peroxides are obtainable by the reaction of hydrogen peroxide and cycloaliphatic ketones having from 4 to 10 carbon atoms in the cycloaliphatic ring that contains the carbonyl carbon atom. They are believed to have structures that may be represented by the formulae

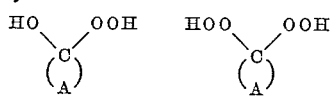

and

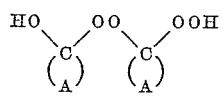

in which A represents a divalent radical comprising an uninterrupted saturated chain of 3 to 9 carbon atoms. Any one or more of these peroxidic compounds may be used as starting materials for the process of this invention.

The preferred peroxidic starting materials for the process of the invention are those "organic cyclic peroxides" that are obtainable by the reaction of a cycloaliphatic ketone composed, except for the oxygen of the carbonyl group, of only carbon and hydrogen and wherein the carbon atom of the carbonyl group forms that part of a carbocyclic saturated ring of from 4 to 5 carbon atoms.

"Organic cyclic peroxides" of the foregoing formulae which have been found to be suitable as reactants in the process of the invention include those in which the divalent radical A is an unsubstituted hydrocarbon radical containing a divalent chain of 3 to 9 carbon atoms as well as those in which the divalent radical A is composed of a divalent chain of 3 to 9 carbon atoms substituted by one or more hydrocarbon groups, such as alkyl, cycloaliphatic or aromatic hydrocarbon groups containing from 1 to 12 carbon atoms, and/or functional groups such as hydroxy, alkoxy, aryloxy, carbalkoxy, carbaryloxy or sulfone groups. Among such suitable starting "organic cyclic peroxides" are those wherein the divalent radical A consists of unsubstituted methylene groups, those wherein A is an alkylene group of from 4 to 9 carbon atoms that is unsubstituted on one of the two terminal carbon atoms and the other carbon atoms of the chain may be substituted by methyl, ethyl, propyl, butyl, benzyl, phenyl, cyclohexyl, hydroxy, methoxy, carboxy, or carbalkoxy substituents, and those in which the divalent radical A forms a part of a phenyl or cyclohexyl ring. Representative examples of such suitable divalent radicals are:

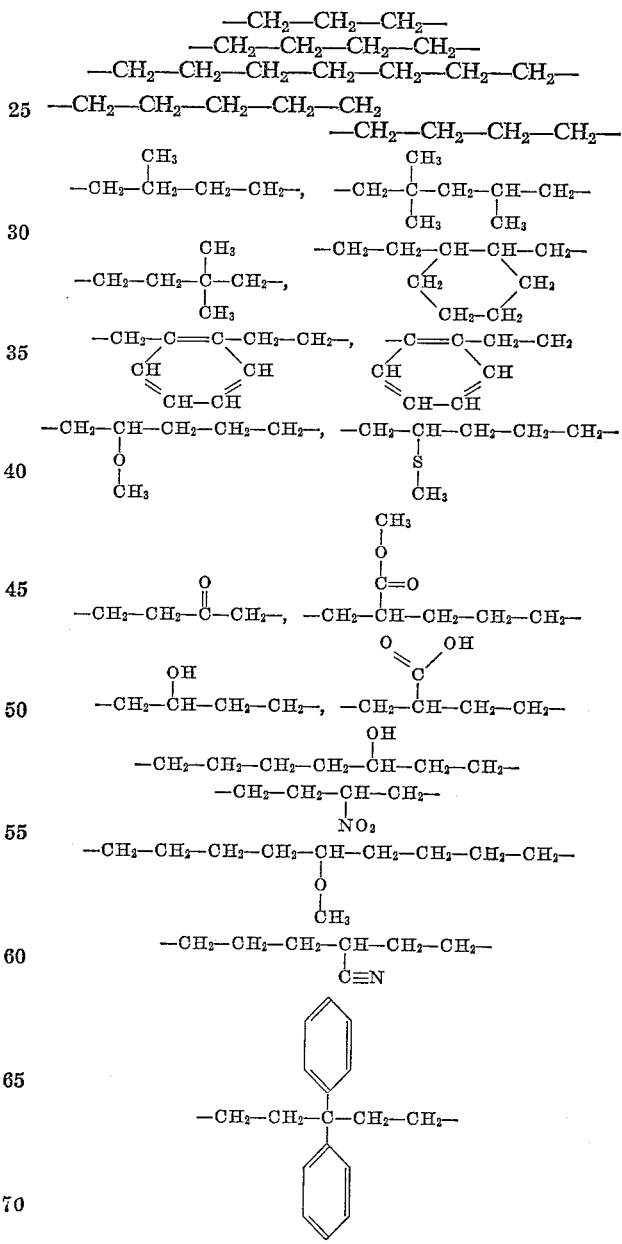

and like divalent radicals.

Especially useful "organic cyclic peroxides" are those in which the divalent radical A contains only hydrogen or carbon atoms directly linked to the two carbon atoms to which its free bonds are attached. A particularly preferred subspecies is that in which A represents a divalent radical of the formula

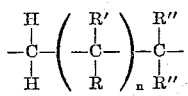

wherein R' and R" represent hydrogen atoms, halogen atoms or hydrocarbon radicals and $n$ is an integer from 1 to 7.

Among the substituted peroxides that may be used as starting materials in the process of this invention are those that are obtainable by reacting hydrogen peroxide with the following ketones: 2-hydroxycyclobutanone, 2-chloro- and 3-chlorocyclobutanone, 2-chlorocyclopentanone, 3-nitrocyclopentanone, 2-hydroxycyclopentanone, 4-carboxycyclopentanone, 5-cyanocyclopentanone, 3-chlorocyclohexanone, 4-hydroxycyclohexanone, 4-methoxycyclohexanone, 3-methylpropionate cycloheptanone, 2-hydroxycycloheptanone, 6-carbethoxycycloheptanone, 4-methylcycloheptanone, 4-ethylsulfonecyclooctanone, 5-florosulfonecyclooctanone, 2-ethoxycyclononanone, 4-carboxycyclopentanone, and the like.

Illustrative hydrocarbon-substituted peroxidic starting materials that may be employed are those that are obtainable by reaction between hydrogen peroxide and such cyclic ketones as 2-phenylcyclobutanone, 2,3-diphenylcyclobutanone, 2,3-diphenylcyclopentanone, 2,4,5-triphenylcyclohexanone, 2-phenyl-3-ethylcyclobutanone, 2,4-diphenyl-3-methylcyclopentanone, 4-phenyl-5-pentyl-6-ethylcyclohexanone, 2,4-dimethylcyclobutanone, 3-ethylcyclopentanone, 2-methyl-3-ethylcyclopentanone, 2-ethyl-5-octylcyclohexanone, 2-propyl-4-butylcyclohexanone, 4-butylcyclohexanone, 7-methylcyclohexanone, 3-pentacycloheptanone, and the like.

The starting material is referred to above as an "organic cyclic peroxide" which may be prepared by treating the corresponding cyclic ketone with hydrogen peroxide. Hence, the novel reaction of this invention may have either of two starting points: (1) the formation of the halogenated aliphatic monocarboxylic acids from the "organic cyclic peroxide" formed in situ by the reaction of hydrogen peroxide and the appropriate cyclic ketone, and (2) the action of the halogen-yielding compound on the "organic cyclic peroxide" supplied to the reaction mixture as a separate and distinct reactant. In either case, the "organic cyclic peroxide" is an essential ingredient in the process of this invention and it is immaterial whether it be formed in situ or is used as a separate and distinct reactant.

As previously indicated, the reaction of the "organic cyclic peroxide" with the halogen-yielding compound is conducted under "redox" conditions. The term "redox" denotes an oxidation-reduction in which an electron transfer takes place with formation of a free radical. Any of the reducing agents applicable in redox reactions can be used. It has been found that ferrous ion is a particularly useful reducing agent in the reaction in question, but ions of other heavy metals having multiple valences can likewise be used. Examples of such suitable metal ions are schromous, vanadous, and the like. Other types of reducing agents which are suitable are, for instance, 1-ascorbic acid, one or more reducing sugars or the like, these reducing agents being employed together with a small amount of ferrous or ferric or other multivalent metal ion to act as a promoter which is maintained in the reduced state by the other reducing agent present. As applied in the reaction of this invention, the reducing agent is used in the presence of strong, non-oxidizing mineral acid. Such acids include sulfuric acid, phosphoric acid, pyrophosphoric acid, and the like.

The halogen-yielding compound may be a geminate hydrocarbon polyhalide of which at least one of the geminate halogen atoms is bromine or iodine such as an alkenylidene polyhalide of from 1 to 8 carbon atoms containing at least one atom of bromine or chlorine on a polyhalogeno-substituted terminal carbon atom. Such compounds include bromoform, bromotrichloromethane, dibromomethane, dibromodichloromethane, 1,1-dibromomethane, 1,1-dibromobutane, 1,1-dibromo-5-chloropentane, and the like. Preferably, the geminate halogen-substituted alkane is selected from those having 1 to 4 carbon atoms. Alternatively, the halogen-yielding compound may be selected from a metal salt of bromine or iodine. Such salts include the alkali metal bromides and iodides in addition to others which include, for example, ammonium bromide and iodide, barium bromide and iodide, and the like.

The reaction is most most conveniently conducted in a mutual solvent for the organic starting material and the halogen donor. Depending upon the identity of the organic starting material and the halogen donor, there may be used alcohols such as methyl, ethyl, isopropyl alcohols; ethers, for instance, diethyl ether, dioxane, etc.; or other solvents.

From the "organic cyclic peroxide," the halogen-yielding compound and the reductant reacted in the presence of a mineral acid, the halogen acids are prepared. However, certain conditions of the reaction are found to be of considerable importance in order to obtain maximum yields. One such condition involves the order in which the reactants are brought into admixture. It is found that undesirable side reactions are favored if the reaction mixture is permitted to become too acidic, particularly in the early stages of the reaction. The reaction that is productive of the desired halocarboxylic acids consumes acid, as will be seen from the following equation representing the formation of omega-bromohexanoic acid from cyclohexanone, hydrogen peroxide, sulfuric acid, ferrous sulfate, and sodium bromide:

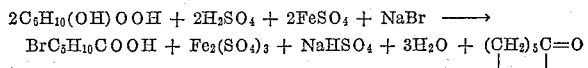

For maximum yields the mineral acid, e.g. sulfuric acid, should be added to the reaction mixture at a rate not substantially greater than the rate that it is consumed in the reaction. Therefore, it will be found that higher yields are obtained when the halogen-yielding compound, hydrogen peroxide and cyclic ketone are added to the solvent followed by the reducing agent and mineral acid. The last two may be added in the form of a mixture or the reducing agent may be added first followed by the non-oxidizing acid. In either case it is the non-oxidizing acid which may cause lower yields and therefore is desirably added in increments. When a brominated alkane is used as the halogen-yielding compound, considerably greater latitude in the order of addition of the reactants is permitted without a corresponding reduction in yield. Thus, a mineral acid, e.g., sulfuric acid, may be mixed with the reductant which mixture may thereafter be added to the cyclic ketone, hydrogen peroxide and halogen-yielding alkane. If desired, the mineral acid can be added to a mixture of the cyclic ketone, hydrogen peroxide and halogen-yielding alkane followed by the addition of the reductant. As a preferred embodiment, however, it is desirable to form a solution of the reductant and the mineral acid and thereafter add that solution to a mixture of the other reactants.

A second condition to be considered in order to obtain maximum yields exists where the bromocarboxylic acids are to be prepared by reaction of an "organic cyclic peroxide" with an appropriate bromine-yielding compound in the presence of ferrous ion as the reductant. The yield of the bromo acid may be lower in the event that there is employed less than the gram-equivalent of ferrous ion per gram-mole of the other reactant. Thus, for maximum yields of the bromo carboxylic acids, there should be employed an amount of ferrous ion as indicated by the last equation. Use of a slight excess of ferrous ion, in the order of a 10% excess based on the stoichiometric requirement, may be desirable in order to insure maximum yields of the desired product. Apparently as the ferric ion can be reduced by iodide to the ferrous form, the stoichiometric amount of the ferrous ion is not similarly required when iodocarboxylic acids are to be prepared and as little as 5%, or even less, of ferrous ion, based on the molar amount of the other reactant, may be used without significantly reducing the yield of the desired product.

The products that result from the reaction will vary depending on the particular cyclic ketone and/or "organic cyclic peroxide" used. In general the ring will be opened between the carbonylic atom of the cyclic ketone and the adjacent methylene groups and the bromine or iodine atom will add to the carbon atom of the adjacent —CH$_2$— group. When substituents are present, or the substituents are complex, the ring will open at other points sometimes resulting in mixed products. Some of the reactions of this invention may be generally represented by the following equations wherein the term "halogen donor" indicates the donor of the bromine or iodine atom.

(I)

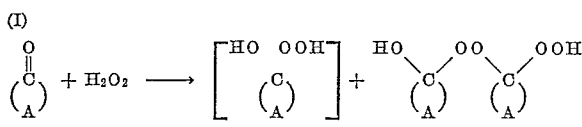

(II)

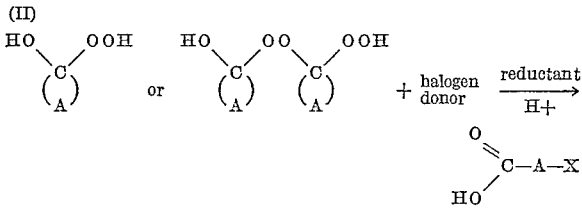

Equations I and II show a two step process but they may be combined to form the products in situ by the following reaction:

(III)

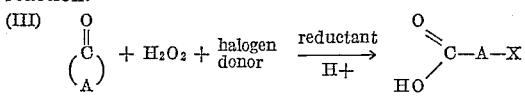

The scope of the invention can be better understood by making reference to specific reactions. Equation IV is representative of the reaction involving cyclobutanone with ferrous sulfate as the reductant:

(IV)

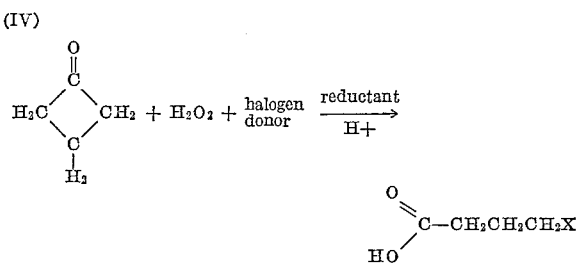

When the cyclic compound is substituted by hydrocarbon radicals (V) or with functional groups (VI) such substituents will appear on the same carbon atom that they occupied in the ring but the ring will open between the 1- and 2-positions:

(V)

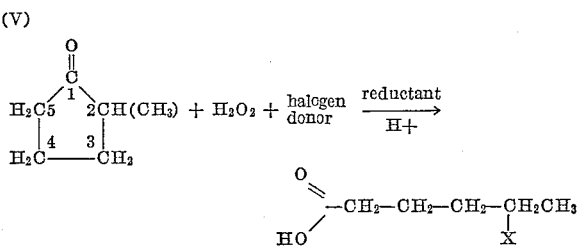

(VI)

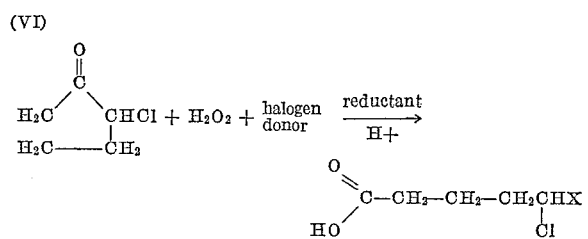

The reaction may also involve cyclic compounds that have a plurality of substituents:

(VII)

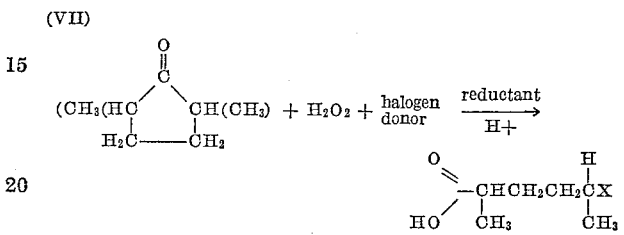

The products of this invention may be used principally as starting materials in the preparation of other acid derivatives. One such reaction involves the preparation of lysine, alpha-epsilon-diamino-caproic acid, from 6-bromocaproic acid upon bromination and treatment with ammonia.

Temperatures of the order of about —15° C. to about 50° C., more preferably temperatures in the range of about 25° C., are suitable for the reaction, which is advantageously carried out at a pressure sufficient to maintain a liquid phase and may be atmospheric or higher or lower pressures. The reaction is relatively rapid at these temperatures, and reaction times of about 30 to 60 minutes are usually sufficient for satisfactory conversions and yields of desirable products.

Various methods of carrying out the process can be employed-continuous, intermittent or batch operation being satisfactory. One method which is useful in operating on a continuous scale is to continuously feed a solution of the cyclic ketone and hydrogen peroxide into a closed stirred mixer into which the halogen compound to be reacted therewith is also fed and dissolved under rapid stirring and cooling. The resulting solution is continuously withdrawn and fed together with a solution of the chosen reductant, preferably an acidified aqueous solution of ferrous sulfate, through a reaction coil provided with a jacket through which a temperature regulating medium is circulated, the rate of flow being controlled so as to insure mixing and a proper period of reaction. A similar order of addition of the reactants can be used in batchwise operation, or in either case the reactants can be introduced in other ways although such are generally less desirable.

After the reaction is completed, the recovery and the purification of the acid product can be carried out in any suitable way. Thus, for example, where an alcohol is used as the solvent medium, the acid may be obtained in the form of the corresponding ester by heating the acidified mixture under esterification conditions. Alternatively, the reaction mass may be extracted with selective solvents and isolated therefrom by washing with water to remove any metal salt of the reductant which may have formed. The solvent extract is then washed with a diluent basic solution, such as 2 N sodium hydroxide to separate the acid product from non-acid products which may have formed. Regeneration of the acid product is accomplished with a mineral acid such as sulfuric acid and then extracted with a solvent such as ether—washed and dried. The use of selective solvents is particularly useful when mixed isomers are formed. Likewise, ordinary distillation and/or steam distillation may be used.

The following examples will illustrate in more detail some of the representative reactions of this invention.

In the examples the proportions of the reactants are expressed in parts by weight.

Example I

This example illustrates the reaction of cyclohexanone with two moles of hydrogen peroxide and double molal quantities of acidified ferrous sulfate in the presence of sodium bromide.

Into a one liter three-necked flask provided with a Tru-bore stirrer, dropping funnel and means for flushing with nitrogen is charged 11.8 grams (0.12 mole) of cyclohexanone. The cyclohexanone is cooled to 0° C. and 22 ml. of 30% (0.2 mole) hydrogen peroxide is added and the whole was agitated for 10 minutes. To this mixture is added 500 ml. methanol and the solution is then cooled to −20° C. in a Dry Ice-alcohol bath. Powdered sodium bromide, 15.5 grams (0.15 mole) is added and agitation is continued for an additional 15 minutes. A solution of 60 grams (0.22 mole) of ferrous sulfate heptahydrate in 140 ml. of water containing 20 ml. (0.38 mole) of concentrated sulfuric acid is added dropwise over a 90 minute period with constant agitation while maintaining the reaction at −20° C. Agitation is continued for an additional three hours whereupon the reaction mixture is poured into one liter of distilled water. The aqueous mixture is extracted with ether and the ether extract is washed with water and then extracted with 2 N sodium hydroxide. The neutral ether extract is reserved for further investigation. Acidification of the alkaline extract with dilute sulfuric acid liberates free bromocaproic acid which is extracted with ether and worked up. In this way 15 grams of crude liquid E-bromocaproic acid is obtained. Recrystallization from petroleum ether yields 12.5 grams (54%) of pure product, M.P. 35–36° C. The ether from the above neutral fraction is removed and the residue is distilled at 64–66° C. at 0.3 mm. The fraction gives a positive hydroxamic acid test for ester and corresponds to the methyl ester of E-bromocaproic acid, B.P. 54–56° C. at 0.1 mm., $n_D^{20}$ 1.4621. The 6-bromo acid and ester formed account for about 90–95% of the starting cyclohexanone.

Example II

To a reaction vessel equipped with an agitator, reflux condenser and thermometer is added 12 grams of cyclohexanone with subsequent cooling to 0° C. With gentle agitation, 11.3 grams of 30% hydrogen peroxide is added followed by 100 mls. of methanol and 40 grams of bromotrichloromethane. The pH is then adjusted to 6.5 with sulfuric acid. When the reaction mixture becomes homogeneous, 16.7 grams of ferrous sulfate dissolved in 100 grams of water is added in small increments over a period of about 45 minutes. Thereafter the procedure of Example I is followed to yield 6-bromocaproic acid.

Example III

The procedure of Example I is followed except that 8.5 grams of cyclobutanone, hydrogen peroxide and an equivalent amount of potassium bromide is used to yield 4-bromobutyric acid.

Example IV

Using 2-propylcyclopentanone, hydrogen peroxide, potassium bromide and sulfuric acid according to the procedure of Example I, 5-bromooctanoic acid is obtained.

Example V

The procedure of Example I is repeated using 4-cyanocyclohexanone to produce the corresponding gamma-cyano-omega-bromocaproic acid. With the corresponding methyl sulfone substituent, 4-methyl-sulfone-omega-bromocaproic acid is produced.

Example VI

By the treatment of cyclooctanone, hydrogen peroxide and sodium bromide with phosphoric acid and a reductant, 8-bromooctanoic acid is produced.

Example VII

Cyclodecanone, hydrogen peroxide, dibromomethane, sulfuric acid and a redox reducing agent, as ferrous sulfate, is reacted to yield omega-bromodecanoic acid. The same product is obtained by the reaction of 1-hydroxycyclodecyl peroxide, sodium bromide and a redox reducing agent in the presence of a mineral acid such as phosphoric acid.

Example VIII

To a reaction vessel equipped as in Example I are charged 11.8 grams (.12 mole) cyclohexanone, 11 ml. 30% hydrogen peroxide (.1 mole) and 300 ml. anhydrous methanol. The resulting solution, maintained at 0° C. in an atmosphere of an inert gas, such as nitrogen, is agitated for about 10 minutes. Thereafter, 22.5 grams (.15 mole) of powdered sodium iodide is added to the solution followed immediately by the dropwise addition over a 5 minute period of a solution of ferrous sulfate heptahydrate comprising 30.6 grams (.11 mole) of the sulfate, 100 ml. of water and 5 ml. (9.8 grams) of concentrated sulfuric acid (.1 mole). The reaction mixture is agitated for 2 hours while being maintained at 0° C. and thereafter it is poured into 1000 ml. of water. The solution is then extracted with ether followed by separation of the ether layer and washing it several times with water after which the acid product is extracted from the ether by treating with three portions of 50 ml. of 2 N sodium hydroxide. The combined alkaline extracts are acidified with dilute sulfuric acid and the liberated product is extracted with ether. The ether solution thus obtained is washed with water, dilute sodium thiosulfate solution and then dried. The ether is then removed by flashing and 11 grams of a crystalline residue remains which is recrystallized from petroleum ether. The recrystallized product, 10 grams, is identified as omega-iodocaproic acid, M.P. 52–53° C. and has the following analysis: Neutralization equivalent, found 250; calculated (for $C_6H_{11}O_2I$) 242; C, 30.2%; H, 4.89%; I, 51.5%; calculated, C, 29.7%; H, 4.6%; I, 52.5%.

It is found that in the absence of the reductant, omega-iodocaproic acid is not formed.

Example IX

Into a reaction vessel equipped as in Example I are charged .4 mole of 2-chlorocyclohexanone, 1200 ml. of anhydrous methanol, and .4 mole of 30% hydrogen peroxide. The solution is cooled in an ice bath for about 15 minutes after which 0.6 mole of powdered sodium bromide is added. With constant agitation 0.44 mole of ferrous sulfate heptahydrate dissolved in 400 ml. of water containing 20 ml. of concentrated sulfuric acid is added in increments over a 45 minute period. After the addition is complete the mixture is continuously stirred for an additional two hours while maintaining the temperature at 0° C. after which the reaction mixture is poured into 1000 ml. of water. Separation of omega-bromo-omega-chlorocaproic acid is accomplished by extraction with ether and dilute sodium hydroxide as in Example VIII. There is obtained 38 grams of a residue which is distilled to yield 27 grams of omega-bromo-omega-chlorocaproic acid at 117° C. (0.15 mm). The product is identified by the following analysis: Neutralization equivalent, found 237; calculated (for $C_6H_{10}O_2BrCl$) 229.5; C, 31.3%; H, 4.4%; halogen, 50.5%; found C, 31.7%; H, 4.6%; halogen, 49.7%.

Example X

Into a reaction vessel equipped as in Example I are charged .08 mole of 2-methylcyclohexanone dissolved in 300 ml. of anhydrous methanol and .08 mole of 30% hydrogen peroxide. After flushing the reaction vessel with nitrogen the mixture is cooled in an ice bath for 15 minutes after which 0.12 mole of solid sodium bromide is added. To the reaction vessel is added, over a 20 minute period, a solution containing .09 mole of ferrous sulfate heptahydrate dissolved in 80 ml. of water containing 4 ml. of concentrated sulfuric acid. The reaction mixture, while maintained at 0° C. is agitated for 2 hours after which it is poured into 800 ml. of water and extracted and washed as in Example VIII. The residue, which remains after the separation, is identified as 6-bromo-heptanoic acid, neutralization equivalent 222, calculated 219. The product is heated with 7 grams of dimethylaniline for 4 hours at a temperature of 210–220° C. in order to dehydrobrominate the product. The mixture is allowed to cool and then poured into several milliliters of 2 N sodium hydroxide. The dimethyl aniline is removed by extraction with ether and the aqueous layer is acidified with dilute sulfuric acid and the product acid is extracted with ether. After working up, .6 gram of a mixture of hepten-6-oic acid and hepten-5-oic acid is obtained, neutralization equivalent 131; calculated for $C_7H_{12}O_2$, 128. The acids are then dissolved in carbon tetrachloride and ozonized whereupon they are found to absorb the calculated amount of ozone.

*Example XI*

The procedure of Example X is followed except that 2-phenylcyclohexanone is substituted for the 2-methylcyclohexanone. The omega-bromo-omega-phenyl caproic acid obtained has a neutralization equivalent of 272 compared to a calculated value of 271.2 for $C_{12}H_{15}O_2Br$.

From the foregoing discussion and examples, it will be seen that considerable variations in the processes are possible without departing from the spirit of the invention. The process of this invention provides a novel method for the production of acyclic acids as the halogen atom may be simply removed by any conventional method of dehydrohalogenation. The products thus obtained are well known and find a multitude of uses in the chemical arts.

This invention is a continuation-in-part of copending application Serial No. 581,312, filed April 30, 1956, now abandoned.

We claim as our invention:

1. A process for producing omega-halogenated aliphatic carboxylic acids which comprises reacting
   (1) cyclohexyl peroxide,
   (2) a geminate organic polyhalide of 1 to 2 carbon atoms having at least one bromine, the remaining halogens being selected from the group consisting of bromine and chlorine,
   (3) a redox reducing agent and
   (4) a mineral acid.

2. The process of claim 1 in which the geminate organic polyhalide is bromotrichloromethane.

3. A process for producing halogenated aliphatic carboxylic acids substituted by bromine which comprises reacting
   (1) an organic carbocyclic peroxide with no more than a single olefinic double bond and having from 4 to 10 carbon atoms in the ring nucleus in which the only substituents on the ring are selected from the group consisting of alkyl groups of from 1 to 12 carbon atoms, benzyl, phenyl, cyclohexyl, hydroxy, methoxy, ethoxy, carboxyl, methylthio, acetate, nitro, oxo, cyano, chloro, butadienylene, butylene, methylpropionate, methylsulfone, and ethylsulfone,
   (2) a geminate organic polyhalide having at least one bromine,
   (3) a redox reducing agent, and
   (4) mineral acid.

4. A process for producing halogenated aliphatic carboxylic acids substituted by iodine which comprises reacting
   (1) an organic carbocyclic peroxide with no more than a single olefinic double bond and having from 4 to 10 carbon atoms in the ring nucleus in which the only substituents on the ring are selected from the group consisting of alkyl groups of from 1 to 12 carbon atoms, benzyl, phenyl, cyclohexyl, hydroxy, methoxy, ethoxy, carboxyl, methylthio, acetate, nitro, oxo, cyano, chloro, butadienylene, butylene, methylpropionate, methylsulfone, and ethylsulfone,
   (2) a geminate organic polyahalide having at least one iodine,
   (3) a redox reducing agent and
   (4) mineral acid.

5. A process for preparing aliphatic carboxylic acids substituted by bromine with comprises reacting
   (1) an organic carbocyclic peroxide with no more than a single olefinic double bond and having from 4 to 10 carbon atoms in the ring nucleus in which the only substituents on the ring are selected from the group consisting of alkyl groups of from 1 to 12 carbon atoms, benzyl, phenyl, cyclohexyl, hydroxy, methoxy, ethoxy, carboxyl, methylthio, acetate, nitro, oxo, cyano, chloro, butadienylene, butylene, methylpropionate, methylsulfone, and ethylsulfone,
   (2) a member selected from the group consisting of:
      (a) alkali metal bromides,
      (b) barium bromide and
      (c) ammonium bromide,
   (3) a redox reducing agent and
   (4) mineral acid.

6. A process for preparing halogenated aliphatic carboxylic acids substituted by iodine which comprises reacting
   (1) an organic carbocyclic peroxide with no more than a single olefinic double bond and having from 4 to 10 carbon atoms in the ring nucleus in which the only substituents on the ring are selected from the group consisting of alkyl groups of from 1 to 12 carbon atoms, benzyl, phenyl, cyclohexyl, hydroxy, methoxy, ethoxy, carboxyl, methylthio, acetate, nitro, oxo, cyano, chloro, butadienylene, butylene, methylpropionate, methyl sulfone, and ethylsulfone,
   (2) a member selected from the group consisting of:
      (a) alkali metal iodides,
      (b) barium iodide and
      (c) ammonium iodide,
   (3) a redox reducing agent, and
   (4) mineral acid.

References Cited in the file of this patent
UNITED STATES PATENTS 2,938,918  Lavigne _____ May 31, 1960
(Filed Feb. 12, 1958; effective date, March 30, 1955)